United States Patent [19]

Wang

[11] Patent Number: 4,914,176

[45] Date of Patent: Apr. 3, 1990

[54] POLY(HETEROCYCLIC) POLYMERS

[75] Inventor: Pen C. Wang, Houston, Tex.

[73] Assignee: Shell Oil Company, Houston, Tex.

[21] Appl. No.: 324,867

[22] Filed: Mar. 17, 1989

[51] Int. Cl.[4] ................................................ C08G 8/02
[52] U.S. Cl. .................................... 528/220; 528/226;
528/229; 528/289; 528/290; 528/291; 528/294;
528/295; 528/298; 528/299; 528/300; 528/335;
528/373; 528/403; 525/437; 525/461; 525/462;
525/470; 525/471; 525/534
[58] Field of Search ............... 528/220, 226, 229, 289,
528/290, 295, 291, 294, 298, 299, 300, 335, 373,
403; 525/437, 461, 462, 470, 471, 534

[56] References Cited

U.S. PATENT DOCUMENTS 3,969,294 7/1976 Papouchado ........................ 524/68
4,100,140 7/1978 Zahir et al. ........................... 526/90
4,663,464 5/1987 Hoekstra .............................. 548/453
4,800,231 1/1989 Wang .................................. 560/176
4,847,388 9/1989 Wang .................................. 548/410

Primary Examiner—John Kight
Assistant Examiner—Sam A. Acquah

[57] ABSTRACT

Novel thermoplastic polymers of relatively high glass transition temperatures are characterized by five-carbon moieties having a keto group in the 3-position alternating with bis(benzoheterocyclic) moieties. The polymers are produced by reaction of a keto-$C_5$ source, selected from 4-oxoheptanedioic acid compounds or a 1,6-dioxa [4.4] spirodilactone, with a bis(ortho-phenylene amine) compound. Further cyclization of the initial polymer product or reaction of a bis(ortho-phenylenediamine) provides a polymer having a hexacyclic repeating unit.

36 Claims, No Drawings

POLY(HETEROCYCLIC) POLYMERS

FIELD OF THE INVENTION

This invention relates to a novel class of benzoheterocyclic polymers having keto functionality in the moiety linking the heterocyclic groups, and to the process for the production of such polymers. More particularly, the invention relates to novel polymeric materials produced by reaction of a bis(ortho-phenylene amine) compound and a source of a five-carbon, keto-containing linking group, which source is a 4-oxoheptanedioic acid compound or a 1,6-dioxa [4.4] spirodilcatone. In a special case, the invention relates to a product of even greater cyclic functionality obtained by cyclization of the product initially formed when the bis(ortho-phenylene amine) compound is a bis(ortho-phenylenediamine).

BACKGROUND OF THE INVENTION

The class of thermoplastic polymers is well known in the art in part because of the useful characteristic of many such materials of being heat deformable at relatively low temperatures. Such thermoplastics are processed by conventional methods including extrusion, injection molding or thermoforming into films, fibers, sheets and shaped or molded articles of established utility. However, the low temperature deformation property that makes many thermoplastics useful serves to preclude their use in applications where higher temperatures are likely to be encountered. Moreover, continued exposure to elevated temperature often results in undue degradation of the plastic.

Many if not most thermoplastics are polymeric in character having repeating units designed in part to increase the molecular weight and thus the melting point or glass transition temperature of the thermoplastic in order to increase its usefulness in higher temperature applications. An alternate approach to overcoming the problem of poor performance at higher temperatures is through the use of thermoplastics which incorporate cyclic or polycyclic structures within the polymeric molecule. The production of such thermoplastics frequently involves a complex synthesis and/or a somewhat unusual catalyst system. It would be of advantage to provide a novel class of polycyclic thermoplastics having more desirable high temperature properties.

SUMMARY OF THE INVENTION

The present invention provides a class of novel heterocyclic polymers and a method of producing them. More particularly, the invention relates to the reaction of a bis(ortho-phenylene amine) compound and a source of a five-carbon keto-containing moiety selected from a 4-oxoheptanedioic acid compound or a 1,6-dioxa [4.4] spirodilactone. The invention further relates to the specific case of a compound of greater cyclic functionality produced by heating the polymer initially formed when the bis(ortho-phenylene amine) compound is a bis(ortho-phenylene diamine).

DESCRIPTION OF THE INVENTION

The novel class of polymers of the invention comprises polymers having bis(benzoheterocyclic) moieties alternating with a five-carbon keto-containing connecting group. The source of the five-carbon keto-containing group, i.e., a keto-$C_5$ source, is a 4-oxoheptanedioic acid compound or a 1,6-dioxa [4.4] spirodilactone.

In one modification of the process of the invention, the keto-$C_5$ source is a ketodicarboxylic acid compound having two carbon atoms between the keto group and each carboxy function, or in other terms a 4-oxoheptanedioic acid compound. Although a variety of such 4-oxoheptanedioic acid compounds having a variety of substituents in addition to the keto group and the carboxy functions, a preferred class of 4-oxoheptanedioic acid compounds are those acid compounds having up to 30 carbon atoms inclusive represented by the formula

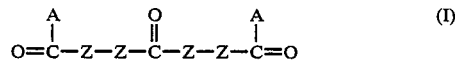

wherein A independently is hydroxy, lower alkoxy of up to 4 carbon atoms, preferably methoxy, or halo, preferably the middle halogens chloro or bromo. In the formula I, Z independently is $>C(Z')_2$) in which $Z'$ is hydrogen, lower alkyl of up to 4 carbon atoms inclusive, preferably methyl, halo, preferably the lower halogens fluoro or chloro, or aryl preferably phenyl, or Z is such that two adjacent Z groups taken together form a ring system $Z''$ of from 5 to 7 ring atoms up to two of which are heteroatoms selected from nitrogen, oxygen or sulfur with the remainder of the ring atoms being carbon atoms, there being up to 15 carbon atoms in each $Z''$, two of which form a bridge between the carbon atoms connected by the adjacent Z groups. When the adjacent Z groups form a ring system $Z''$ the ring system is aromatic, cycloaliphatic or heterocyclic, is saturated or is unsaturated with aromatic or aliphatic unsaturation and is otherwise hydrocarbyl containing only atoms of carbon and hydrogen in addition to any heteroatoms or is substituted hydrocarbyl additionally containing other atoms in the form of inert carbon atoms substituents, for example, halogen atoms, particularly the middle halogens.

In one embodiment where the 4-oxoheptanedioic acid compound is employed as the keto-$C_5$ source, the Z moieties are acyclic, in that they are not part of a cyclic ring system even though a given Z moiety may include a cyclic aryl substituent. Expressed in other terms, each Z is $>C(Z')_2$. Such acyclic 4-oxoheptanedioic acid compound are represented by the formula

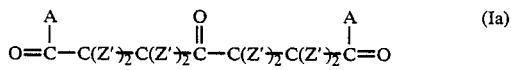

wherein A and $Z'$ have the previously stated meanings. Illustrative of such acyclic 4-oxoheptanedioic acid compounds are 4-oxoheptanedioic acid compounds are 4-oxoheptanedioic acid, dimethyl 4-oxoheptanedioic acid compounds are 4-oxoheptanedioic acid, dimethyl 4-oxoheptanedioate, 2,3,5,6-tetramethyl-4-oxoheptanedioic acid, diethyl 3,5-diphenyl-4-oxoheptanedioic acid, diethyl 3,5-diphenyl-4-oxoheptanedioate, di-n-propyl 2,6-di-n-butyl-4-oxoheptanedioate, 3,5-dimethyl-4-oxoheptandioyl chloride and 6-carbomethoxy-2,6-dimethyl-4-oxohexanoic acid. The preferred 4-oxoheptanedioic acid compounds of formula I are those wherein at least one $Z'$ and preferably both $Z'$ groups on each $Z'$-substituted carbon atom are hydrogen, and wherein each A is hydroxy or alkoxy, preferably hydroxy.

The ketodiacid compounds of formula I are known compounds or are produced by known methods, but certain of the esters of formula Ia, i.e., those compounds of formula Ia wherein A is alkoxy, are conveniently prepared by reaction of formaldehyde and an ethylenically unsaturated carboxylic acid ester such methyl acrylate, ethyl methacrylate, methyl crotonate or propyl 2,3-dimethyl-2-butenoate. This reaction is conducted in the presence of a thiazolium salt and a tertiary amine catalyst system and produces the 4-oxoheptanedioate ester derivatives in good yield. The process is described in more detail in copending U.S. patent application Ser. No. 171,999, filed Mar. 23, 1988, now U.S. Pat. No. 4,800,231 incorporated herein by reference. Conversion of the esters thereby obtained to the corresponding acids or acid halides is by conventional methods.

In a second embodiment of the 4-ketoheptanedioic acid compounds as the keto-$C_5$ source, the ketodiacid incorporates fused cyclic substituents between the keto group and each carboxy function, i.e., the adjacent Z groups are Z". Such ketodiacids are represented by the formula

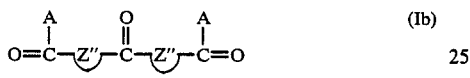

wherein A and Z" have the previously stated meanings. Illustrative of these cyclic ketodiacids are di(2-carboxyphenyl) ketone, di(2-carboxycyclohexyl) ketone, di(2-carbopropoxycyclo-4-pentenyl) ketone, di(2-chlorocarbonyl-phenyl) ketone, di(3-carboxy-2-pyridyl) ketone, 2-carboxyphenyl N-methyl-3-carboxy-2-pyridyl) ketone, 2-carboxyphenyl N-methyl-3-carboxy-2-pyrryl ketone, di(3-carbethoxy-2-morpholyl) ketone and di(3-carboxy-2-naphthyl) ketone. The preferred ketodiacid compounds of formula Ib are those wherein each Z" is a ring system of from 5 to 6 carbon atoms including up to one nitrogen atom. Particularly preferred are such compounds wherein Z" is benzo. The dicyclic ketodiacid compounds of formula Ib are known compounds or are produced by known methods, for example, the process of Conover et al, U.S. Pat. No. 1,999,181 or the method of Cava et al, J. Am. Chem. Soc., 20, 6022 (1955).

In yet another embodiment of the ketodiacid compounds as the keto-$C_5$ source, the 4-oxoheptanedioic acid compounds incorporate one fused ring cyclic substituent with the remainder of the Z groups being acyclic, i.e., the compounds represented by the formula

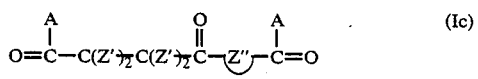

wherein A, Z' and Z" have the previously stated meanings. Such 4-oxoheptanedioic acid compounds of one fused ring substituent are exemplified by 3-(2-carboxybenzoyl)propionic acid, 3-(2-carbomethoxy-2-pyridyloyl)-2-ethylpropionic acid, methyl (3-(2-carbethoxy-4-methylbenzoyl)propionate and 3-(2-carbethoxybenzoyl)butryl chloride. The ketodiacids of formula Ic are known compounds or are produced by known methods. For example, 2-carboxymethylbenaldehyde reacts with methyl acrylate according to the general teachings of copending U.S. patent application Ser. No. 171,999, filed Mar. 23, 1988, now U.S. Pat. No. 4,800,231 to produce methyl 3-(2-carbomethoxybenzyol)propionate.

In a second modification of the process of the invention the keto-$C_5$ source is a 1,6-dioxa [4.4] spirodilactone in which the spiro rings are substituted with hydrogen or other monovalent substituents or with fused ring cyclic substituents on one or both spiro rings. One class of such [4.4]spirodilactones is represented by the formula

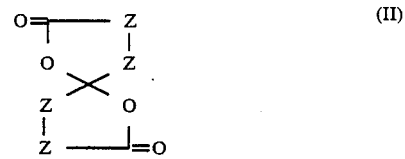

wherein Z has the previously stated meaning.

In the embodiment of the spirodilactone as the keto-$C_5$ source wherein each Z is acyclic, i.e., each Z is C(Z')$_2$, the spirodilactone compounds are represented by the formula

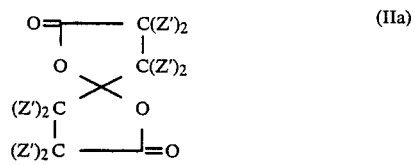

wherein Z' has the previously stated meaning. Illustrative of such spirodilactones are 1,6-dioxaspiro[4.4]nonane-2,7-dione, 3,8-dimethyl-1,6-dioxaspiro[4.4]nonane-2,7-dione, 4,9-diphenyl-1,6-dioxaspiro[4.4]nonane-2,7-dione, 3,4,8,9- tetramethyl-1,6-dioxaspiro[4.4]nonane-2,7-dione, 3,3,4,4,8,8,9,9-octamethyl-1,6-dioxaspiro[4.4]nonane-2,7-dione and 3,4,8,9-tetrafluoro-1,6-dioxaspiro[4.4]nonane-2,7-dione. The preferred spirodilactones of the above formula IIa are those wherein at least one, and preferably both, of the Z' substituents on each Z'-substituted carbon atom are hydrogen. The compounds of formula IIa are known compounds or are produced by known methods such as the method of Pariza et al, Synthetic Communications, Vol. 13 (3), pp. 242–254 (1983).

In the embodiment of the spirodilactone compounds as the keto-$C_5$ source in which a fused cyclic substituent is present on each spiro ring, the spirodilactone compounds are represented by the formula

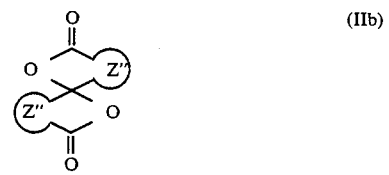

wherein Z" has the previously stated meaning. Typical compounds of formula IIb are 3,4,8,9-dibenzo-1,6-dioxaspiro[4.4]nonane-2,7-dione, 3,4,8,9-di(cyclopentano)-1,6-dioxaspiro[4.4]nonane-2,7-dione, 3,4,8,9-(4-methylbenzo)-1,6-dioxaspiro[2,7-dione and 3,4,8,9-di(pyrido)-1,6-dioxaspiro[4.4]nonane-2,7-dione. These compounds are known compounds or are produced by known methods such as, for example, the process of the above Cava et al article or the process of U.S. Pat. No. 1,999,181.

In a third embodiment of the spirodilactones as the keto-C₅ source, a fused cyclic substituent is attached to one spiro ring while the other spiro ring is free of fused cyclic substituents. These spirodilactones are represented by the formula

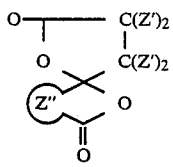 (IIc)

wherein Z' and Z" have the previously stated meanings. This class of spirodilactones includes 3,4-benzo-8-methyl-1,6-dioxaspiro[4.4]nonane-2,7-dione, 3,4-benzo-9-phenyl-1,6-dioxaspiro[4.4]nonane-2,7-dione and 3,3,4,4-tetramethyl-8,9-morpholo-1,6-dioxaspiro[4.4]nonane-2,7-dione. The spirodilactones are known compounds or are produced by known methods such as, for example, by the dehydration of the corresponding ketodiacid. By way of specific illustration, 3,4-benzo-1,6-dioxaspiro[4.4]nonane-2,7-dione is produced by dehydration of 3-(2-carboxybenzoyl)propionic acid through application of heat.

The keto-C₅ source, whether a 4-oxoheptanedioic acid compound or a spirodilactone compound is reacted in the process of the invention with a bis(o-phenylene amine) compound. These amine compound reactants are organic compounds having up to 30 carbon atoms and from one to two aromatic rings inclusive, each ring of which is substituted on adjacent carbon atoms with a first substituent which is an amino substituent, i.e., a —NH₂ group, and a second substituent which is amino, alkylamino, hydroxy or thiol. Preferably the bis(p-phenylene amine) compound has two rings and one first substituent and a second substituent on each ring, but when any one ring is present, there will be two first substituents and two second substituents on the single ring. To produce the polymers of the invention it is required that the first substituent and the second substituent be located on adjacent carbon atoms of the aromatic ring as is the presence of the two active hydrogens on the first substituent, i.e., the —NH₂ substituent, and the presence of at least one active hydrogen on the second substituent. The aromatic rings, when more than one ring is present, are fused or are connected by organic or inorganic linking groups of a considerable variety of structures provided that each of the two rings contains a first substituent and a second substituent located ortho, i.e., adjacent, to each other. One class of such bis(o-phenylene amine) compounds is represented by the formula

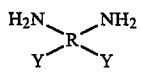 (III)

wherein R is aromatic or up to 30 carbon atoms and up to two aromatic rings, inclusive, which when two rings ar present, are fused or connected by a link, X, where X is a direct valence bond, alkylene of up to 8 carbon atoms inclusive, oxo, thio, sulfonyl, carbonyl, dioxyphenylene, i.e.,

2,2-di(oxyphenyl)propane, i.e.,

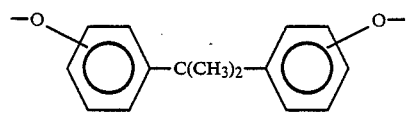

di(oxyphenyl)sulfone, i.e.,

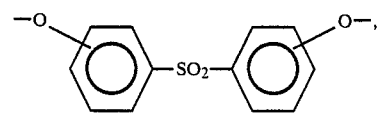

or dioxydiphenylene, i.e.,

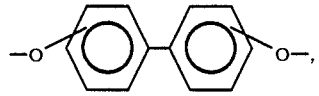

and Y is amino, alkylamino, hydroxy or thiol, with the proviso that each —NH₂ group is located on an aromatic ring carbon atom adjacent to the aromatic ring carbon atom on which a Y group is located, each ring has at least one —NH₂ substituent but no —NH₂ group or Y group is located on an aromatic ring carbon atom adjacent to more than one ring carbon atom on which a —NH₂ group or a Y group is located. Illustrative of such bis(phenylene amine) compounds are 3,3',4,4'-tetraaminobiphenyl, 3,3'-dihydroxy-4,4'-diaminobiphenyl, 2,5-dihydroxy-3,6-diaminobenzene, 2,6-dimercapto-3,7-diaminonaphthalene, di(3-amino-4-hydroxyphenyl) ether, di[3-methylamino)-4-aminophenyl ketone, 2,2-bis(3,4-diaminophenyl)propane, 2,2',3,3'-tetraaminobiphenyl, 1,3-(2,3-diaminophenyloxy)benzene, 2,2-bis[4-(2,3-diaminophenylhloxy)phenyl]propane and 3,3'-diamino-4,4'-di(methylamino)biphenyl. The preferred bis(o-phenylenediamine) compounds, particularly when R has two aromatic rings connected by a direct valence bond.

The reaction of the keto-C₅ source, regardless of whether the source is a 4-oxoheptanedioic acid compound or a spirodilactone compound, and the bis(o-phenylene compound is connected in the liquid phase in the presence of a liquid reaction diluent under polymerization conditions. Suitable reaction diluents are inert to the reactants and the polymer product are liquid under reaction conditions and are capable of dissolving at least a portion of each reactant at reaction temperature. Such diluents include ketones such as methyl isobutyl ketone and di-i-propyl ketone, esters such as ethyl 2-ethylhexanoate, ethers, e.g., acyclic ethers such as diethylene glycol diethyl ether and tetraethylene glycol dimethyl ether as well as cyclic ethers such as tetrahydrofuran or dioxane, N-alkylamides such as N,N-dimethylacetamide and N-methyl-2-pyrrolidone, phenols such as phenol and m-cresol and sulfur-containing diluents such as dimethyl sulfoxide and sulfolane. The preferred reaction diluent is m-cresol.

The keto-$C_5$ source and the bis(o-phenylene amine) compound combine in a 1:1 molar ratio to form the alternating polymer of the invention although in practice it is satisfactory to provide the keto-$C_5$ source and the bis(o-phenylene amine) compound to the polymerization mixture in molar ratios of from about 3:1 to about 1:3 and even higher or lower ratios can be employed. Reactant contact is maintained during the reaction by conventional methods such as shaking, stirring or refluxing. Polymerization conditions include a polymerization temperature from about 80° C. to about 300° C., preferably a temperature of from about 150° C. to about 250° C. The polymerization pressure will be sufficient to maintain the polymerization mixture in the liquid phase. Such pressures are up to about 20 atmospheres but more often are from about 0.8 atmosphere to about 10 atmospheres.

Reaction of the keto-$C_5$ source and the bis(o-phenylene amine) compound results in the production of an alternating copolymer in which a bis(heterocyclic) moiety alternates with a five-carbon bridge having a keto group in the center or 3-position of the bridge. The heterocyclic moieties result from condensation of the carboxy functions of whatever keto-$C_5$ source is employed and the adjacent —$NH_2$ and —Y groups of the bis(o-phenylene amine) compound. The heterocyclic moieties will be benzimidazole moieties if the bis(o-phenylene amine) compound is a bis(phenylenediamine) and benzoxazoyl or benzothiazoyl of the bis(o-phenylene amine) compound is a bis(o-phenylene amine) is a bis(o-phenylene aminophenol) or a bis(o-phenylene aminothiophenol) respectively. [Nomenclature?] In terms of the preferred keto-$C_5$ source (formula I or II) and the bis(o-phenylene amine) compound (formula III) the benzoheterocyclic-containing polymers are represented by the repeating formula

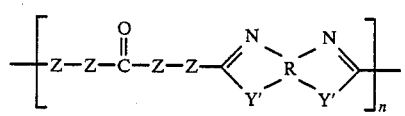
(IV)

wherein Z and R have the previously stated meanings and Y' is the moiety derived by loss of a hydrogen from Y, that is, imino, alkylimino, oxy or thio, with the proviso that the indicated nitrogen and the Y' forming each heterocyclic ring are substituted on adjacent aromatic ring carbons, but no nitrogen is located on more than one carbon atom on which a nitrogen or Y' is located.

The nomenclature of the polymer products of the invention is difficult to determine because of the complexity thereof. However, by way of illustration is the polymer wherein 3-oxo-1,5-pentene moieties alternate with 4,4'-bis(2-benzimidazoyl) moieties illustratively produced by reaction of either 4-oxoheptanedioic acid or 1,6-dioxaspiro[4.4]-nonane-2,7-dione with 3,3',4,4'-tetraaminobisphenyl and the polymer wherein 3-oxo-1,2,4,5-tetramethyl-1,5-pentene moieties alternate with 4,4'-bis(2-benzothiazolyl) moieites illustratively produced by reaction of either diethyl 4-oxo-2,3,5,6-tetramethylheptanedioate or 3,4,8,9-tetramethyl-1,6-dioxaspiro[4.4]nonane-2,7-dione with 3,3'-dimercapto-4,4'-diaminobiphenyl. The identity of other polymeric products will be apparent from consideration of the above formulas for the reactants and for the polymeric product. Of particular interest are the bis(benzoheterocyclic) polymers of formula IV having a molecular weight of from about 1,000 to about 100,000.

The benzoheterocyclic derivatives of the invention are thermoplastic polymers characterized by relatively high glass transition temperature. As such, the polymer products find the range of utilities normally associated with thermoplastic materials. The polymeric products are processed by well known methods conventionally employed for thermoplastics such as injection molding, extrusion and thermoforming into films, fibers, sheets and shaped or molded articles of established utility. Because of the relatively high melting or softening points of the polymers they are additionally useful and engineering thermoplastics in applications where dimensional stability at high temperature is desired. Such applications include the production of containers for food and drink and the production of base materials for electric and electronic applications.

A special case exists with regard to the polymers of the invention which are produced from bis(o-phenylene diamine) compounds because of the remaining active hydrogen substituted on the ring nitrogen of the benzimidazoyl derivatives. Because of these hydrogens and the unique spatial relationship they have with the keto group of the five-carbon alternating unit, it is possible to cylize the initial polymer product by heating to produce a polymeric derivative of even greater cyclic functionality. This potential for cyclization is not present in the polymers produced from bis(o-phenylene amine) compound wherein the Y group is alkylamino, hydroxy or thiol. The cyclization is illustrated by the application of heat to the compound of formula IV in which each Y' group is an —NH— group. The cyclized product is represented by the repeating formula

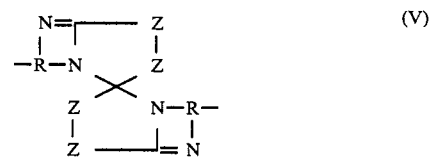
(V)

wherein Z and R have the previously stated meanings. By way of specific illustration is the cyclization of the initial polymer product illustratively obtained by reaction of 4-oxoheptandioic acid and 3,3',4,4'-tetraaminobiphenyl, represented by the formula

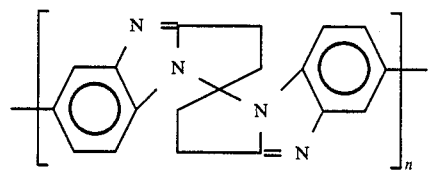

The polycyclic products of formula V have high glass transition temperatures, generally in excess of 300° C., and fine particular utility in adhesive formulations where high temperatures are likely to be encountered, for example, applications in the aerospace industry.

The invention is further illustrated by the following Illustrative Embodiment which should not be construed as limiting the invention.

ILLUSTRATIVE EMBODIMENT

A mixture of 10.71 g (0.05 mole) of 3,3',4,4'-tetraminobiphenyl, 8.71 g (0.05 mole) of 4-oxoheptanedioic acid and 35 ml of m-cresol was placed in a 50 ml resin pot equipped with a mechanical stirrer and a condenser. While being stirred, the mixture was heated to 200° C. and maintained at that temperature for 48 hours. The resulting mixture was then cooled and poured into 500 ml of methanol. The precipitated product was recovered by filtration, washed with methanol and dried in a vacuum oven at 60° C. for 72 hours. The poly(ketobenzimidazole) polymer was found to have a glass transition temperature of 221° C. and the nuclear magnetic resonance spectra were consistent with the proposed structure.

What is claimed is:

1. A thermoplastic benzoheterocyclic polymer wherein a five-carbon moiety containing a keto group in the 3-position alternates with a bis(benzoheterocyclic) moiety.

2. The polymer of claim 1 represented by the repeating formula

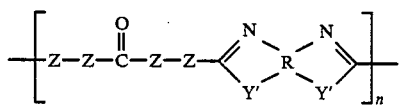

wherein Z independently is $>C(Z')_2$ in which Z' independently is hydrogen, lower alkyl, lower halo or phenyl, or Z is such that adjacent Z groups form a ring system Z'' of from 5 to 7 ring atoms up to two of which are heteroatoms selected from nitrogen, oxygen or sulfur with the remainder of the ring atoms being carbon atoms, there being up to 15 carbon atoms in each Z''', two of which form a bridge between the carbon atoms connected by the adjacent Z groups, R is aromatic of up to 30 carbon atoms and up to two aromatic rings inclusive which, when two rings are present, are fused or connected by a link X where X is a direct valence bond, alkylene of up to 8 carbon atoms inclusive, oxo, thio, sulfonylo, carbonyl, dioxyphenylene, 2,2-di(oxyphenyl)propane, di(oxyphenyl) sulfone or dioxydiphenylene, and Y' is imino, alkylimino, oxo or thio, with the proviso that each indicated nitrogen is located on an aromatic ring carbon atom adjacent to a ring carbon atom on which a Y' group is located but no indicated nitrogen is located on a ring carbon atom adjacent to more than one carbon atom on which a nitrogen or a Y' group is located.

3. The polymer of claim 2 wherein Y' is imino.
4. The polymer of claim 3 wherein R has two rings connected by a direct valence bond.
5. The polymer of claim 4 wherein Z is $>C(Z')_2$.
6. The polymer of claim 5 wherein Z' is hydrogen.
7. The polymer of claim 2 wherein R has two aromatic rings connected by a direct valence bond.
8. The polymer of claim 7 wherein Y is thio.
9. The polymer of claim 7 wherein Y is oxo.
10. The polymer of claim 9 wherein Z is $>C(Z')_2$.
11. The polymer of claim 10 wherein Z' is hydrogen or methyl.
12. The polymer of claim 11 wherein Z' is hydrogen.
13. A process for the production of a benzoheterocyclic polymer wherein a five-carbon moiety containing a keto group in the 3-position alternates with a bis(benzoheterocyclic) moiety which comprises contacting under polymerization conditions (a) a keto-$C_5$ source selected from the 4-oxoheptanedioic acid compound of the formula

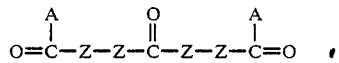

or the 1,6-dioxa [4.4] spirodilactone of the formula

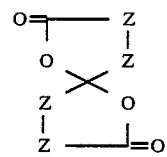

wherein A independently is hydroxy, alkoxy of up to 4 carbon atoms inclusive or middle halo and Z independently is $>C(Z')_2$ in which Z' is hydrogen, lower alkyl, lower halo or phenyl, or Z is such that two adjacent Z groups together form a ring system Z'' of from 5 to 7 ring atoms up to two of which connect the carbon atoms connected by the adjacent Z groups, with (b) a bis(o-phenylene amine compound of the formula

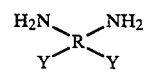

wherein Y is amino, alkylamino, hydroxy or thiol and R is aromatic of up to 30 carbon atoms and two aromatic rings, with the proviso that each —$NH_2$ group is located on a ring carbon atom adjacent to a ring atom on which a Y group is located but no —$NH_2$ group or Y group is located on a ring carbon adjacent to a ring atom on which a Y group is located but no —$NH_2$ group or Y group is located on a ring carbon atom adjacent to more than one ring carbon atom on which a —$NH_2$ group or a Y group is located.

14. The process of claim 13 wherein the keto-$C_5$ source is a 4-oxoheptanedioic acid compound.
15. The process of claim 14 wherein R has two rings connected by a link X wherein X is a direct valence bond, alkylene of up to 8 carbon atoms, inclusive, oxo, thio, sulfonyl, carbonyl, dioxyphenylene, 2,2-di(oxyphenyl)propane, di(oxyphenyl) sulfone or dioxydiphenylene.
16. The process of claim 15 wherein Y is amino.
17. The process of claim 16 wherein X is a direct valence bond.
18. The process of claim 17 wherein Z is $>C(Z')_2$.
19. The process of claim 18 wherein Z' is hydrogen.
20. The process of claim 17 wherein adjacent Z groups are Z''.
21. The process of claim 20 wherein Z'' is benzo.
22. The process of claim 13 wherein the keto-$C_5$ source is a spirodilactone.
23. The process of claim 21 wherein R has two rings connected by X and X is a direct valence bond, alkylene of up to 8 carbon atoms inclusive, oxo, thio, sulfonyl, carbonyl, dioxyphenylene, 2,2-di(oxyphenyl)propane, di(oxyphenyl) sulfone or dioxyphenylene.
24. The process of claim 23 where Y is amino.
25. The process of claim 24 wherein X is a direct valence bond.
26. The process of claim 25 wherein Z is $>C(Z')_2$.

27. The process of claim 26 wherein Z is hydrogen.

28. The process of claim 25 wherein adjacent Z groups are Z".

29. The process of claim 28 wherein Z" is benzo.

30. The polyacyclic polymer of the repeating formula

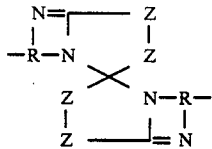

wherein Z independently is C(Z')$_2$ in which Z' independently is hydrogen, lower alkyl, lower halo or phenyl, or Z is such that two adjacent Z groups form a ring system Z" of from 5 to 7 ring atoms up to two of which are heteroatoms selected from nitrogen, oxygen or sulfur with the remainder of the ring atoms being carbon atoms, there being up to 15 carbon atoms in each Z", two of which form a bridge between the carbon atoms connected by the adjacent Z groups, and R is aromatic of up to 30 carbon atoms and up to two aromatic rings inclusive, with the proviso the indicated nitrogen atoms are located on adjacent ring atoms of R.

31. The polymer of claim 30 wherein R has two aromatic rings connected by X wherein X is a direct valence bond, alkylene of up to 8 carbon atoms inclusive, oxo, thio, sulfonyl, carbonyl, dioxyphenylene, 2,2-di(oxyphenyl)propane, di(oxyphenyl) sulfone or dioxydiphenylene.

32. The polymer of claim 31 wherein X is a direct valence bond.

33. The polymer of claim 32 wherein Z is >C(Z')$_2$.

34. The polymer of claim 33 wherein Z is hydrogen.

35. The polymer of claim 32 wherein adjacent Z groups are Z".

36. The polymer of claim 35 wherein Z" is benzo.

* * * * *